US012789483B2

(12) United States Patent
Munro et al.

(10) Patent No.: US 12,789,483 B2
(45) Date of Patent: Nov. 10, 2026

(54) REPAIR OF WIND TURBINE BLADES

(71) Applicant: Green Energy Robotics Ltd, Rhoose (GB)

(72) Inventors: Jack Munro, Rhoose (GB); Harri Lewis, Rhoose (GB); David Lee-Jones, Rhoose (GB)

(73) Assignee: Green Energy Robotics Ltd, Rhoose Barry (GB)

( * ) Notice: Subject to any disclaimer, the term of this patent is extended or adjusted under 35 U.S.C. 154(b) by 222 days.

(21) Appl. No.: 18/562,055

(22) PCT Filed: Apr. 26, 2022

(86) PCT No.: PCT/GB2022/051054

§ 371 (c)(1),
(2) Date: Apr. 19, 2024

(87) PCT Pub. No.: WO2022/248823

PCT Pub. Date: Dec. 1, 2022

(65) Prior Publication Data

US 2024/0308160 A1 Sep. 19, 2024

(30) Foreign Application Priority Data

May 24, 2021 (GB) ...................................... 2107387

(51) Int. Cl.
*B29C 73/02* (2006.01)
*B29C 45/14* (2006.01)
(Continued)

(52) U.S. Cl.
CPC ...... *B29C 73/025* (2013.01); *B29C 45/14336* (2013.01); *B29C 45/2602* (2013.01);
(Continued)

(58) Field of Classification Search
CPC ............ B29C 73/025; B29C 45/14336; B29C 45/2602; B29C 45/641; B29C 45/66;
(Continued)

(56) References Cited

U.S. PATENT DOCUMENTS 11,014,202 B1 * 5/2021 Petersen ................. F03D 80/50
2008/0159870 A1 * 7/2008 Hong ...................... B23P 6/007
416/224

(Continued)

FOREIGN PATENT DOCUMENTS

GB 2315349.7 2/2024
WO PCT/GB2022/051054 7/2026

*Primary Examiner* — Inja Song
(74) *Attorney, Agent, or Firm* — Steven A. Nielsen; www.NielsenPatents.com

(57) ABSTRACT

A mould tool is disclosed, for use in repairing the eroded leading edge of a wind turbine blade. The mould tool comprises a flexible sheet and a framework which is flexible in one direction, for conforming to the curved edge of the blade, but rigid in the other direction. The mould tool may include tapered side walls. Preferably, a method or repair involves use of a mould tool with tapered side walls, and use of a similar mould tool which lacks the tapered side walls. To repair a section of the edge of a turbine blade, first stripes of resin are injected, spaced apart along the length of the section, using the mould with side walls. The gaps between the stripes are then filled using the mould without side walls.

14 Claims, 5 Drawing Sheets

(51) Int. Cl.

| | |
|---|---|
| ***B29C 45/26*** | (2006.01) |
| ***B29C 45/64*** | (2006.01) |
| ***B29C 45/66*** | (2006.01) |
| ***B29C 73/28*** | (2006.01) |
| ***B29L 31/08*** | (2006.01) |
| ***F03D 80/50*** | (2016.01) |
| *B29K 83/00* | (2006.01) |

(52) U.S. Cl.
CPC ............ *B29C 45/641* (2013.01); *B29C 45/66* (2013.01); *B29C 73/28* (2013.01); *F03D 80/502* (2023.08); *B29K 2083/00* (2013.01); *B29L 2031/085* (2013.01); *F05B 2230/21* (2013.01); *F05B 2230/80* (2013.01)

(58) Field of Classification Search
CPC ......... B29C 73/28; B29C 73/04; B29C 73/08; B29C 73/10; F03D 80/502; F03D 80/50; F03D 80/00; B29K 2083/00; B29L 2031/085; F05B 2230/21; F05B 2230/80; F05B 2230/30; F05B 2230/90; F05B 2260/95; F05B 2280/4003; F05B 2280/6011; Y02E 10/72; Y02P 70/50
See application file for complete search history.

(56) References Cited

U.S. PATENT DOCUMENTS

| | | | | |
|---|---|---|---|---|
| 2010/0132137 | A1 * | 6/2010 | Eggleston | B08B 1/34<br>15/21.1 |
| 2012/0305169 | A1 * | 12/2012 | Hanks | B29C 73/10<br>156/391 |
| 2016/0046088 | A1 * | 2/2016 | Haag | B05D 7/52<br>427/535 |
| 2017/0239682 | A1 * | 8/2017 | Muller | B05C 5/0216 |
| 2020/0318619 | A1 * | 10/2020 | Laurberg | B25J 19/00 |
| 2021/0095642 | A1 * | 4/2021 | Cieslak | F03D 80/50 |
| 2023/0048890 | A1 * | 2/2023 | Jensen | B05D 1/28 |

* cited by examiner

REPAIR OF WIND TURBINE BLADES

The present invention relates to tools and methods for repairing damaged wind turbine blades.

BACKGROUND TO THE INVENTION

Wind turbine blades are prone to damage (erosion) in use. This can be caused for example by precipitation and/or debris hitting the blades, which are moving very fast through the air when the wind is blowing. The leading edge of the blade becomes damaged/eroded as a result. This leads to degradation in the aerodynamic characteristics of the blade and hence a loss of performance. If left unrepaired, over time the blade may become damaged to an extent that it could break apart, potentially causing serious danger.

For that reason, blades are inspected from time to time and repairs carried out to fill any erosion on the leading edge of the blade. This is a challenging operation. It is typically done by climbing the turbine and hanging on ropes. This makes it difficult for the repair operative to push against anything with any real force. A thick viscous resin is used to fill gaps and repair the blade. Typically the resin is a two part resin, mixed in a nozzle. After mixing it is workable for no more than about one minute. Essentially the resin is squeezed onto the blade from a resin gun, through the mixing nozzle which has a wide and flat outlet, and then shaped and spread as best as possible with a flexible plastic scraper. The result is that the chips and cracks are filled, but the smooth aerodynamic shape of the leading edge of the blade is still likely to be compromised. It is a difficult, time-consuming and expensive operation which results in a less than optimal repair.

An alternative repair method which has been used is to provide pre-moulded shells and bond them to the blade with adhesive. The pre-moulded shells essentially recreate the edge of the turbine blade. A good aerodynamic blade edge is thus ensured. However, it is not practical to install these shells using rope access—a platform has to be deployed and thus the repair takes longer and is more expensive. Furthermore, the shells have to be specifically produced for the type/model of blade being repaired—blades have different profiles and the profile is usually not constant along the length of the blade. A specifically made kit of pre-moulded shells has to be provided, and the shells need to be installed along the blade in exactly the right order.

It is an object of the invention to solve these problems, and to provide a method of repairing a wind turbine blade which can be carried out using rope access, which can repair many different models and types of blade and which produces a better repair than manually applying resin with a scraper.

STATEMENT OF INVENTION

According to the present invention there is provided a method of making a repair on an edge of a damaged wind turbine blade, the method comprising:

providing a mould, the mould comprising a flexible sheet, and fixing the mould to the turbine blade around the edge of the wind turbine blade;

injecting a resin into the mould and allowing the resin to cure; and removing the mould.

The mould, which is in the form of a flexible sheet, can be flexed to fit around the edge of different shapes of wind turbine blades. As the profile of the edge changes along the length of the blade, the flexible mould can follow the curve of the blade at each section. Typically, the repair is made to the leading edge of the turbine blade, i.e. the edge of the blade that faces towards the direction of travel when the blade is rotating in the wind.

The mould is fixed to the turbine blade while the resin is injected, and remains fixed to the blade while the resin cures. When the resin is cured, the mould is removed from the blade.

The flexible sheet when fitted forms a space between the surface of the blade and the surface of the mould. The space is preferably sealed to contain resin injected into the mould, as long as the mould remains fixed to the turbine blade.

The resin injected into the mould builds up the surface of the blade to create a new aerofoil edge—rather than just attempting to fill cavities caused by erosion, a new edge is formed entirely from resin. Hence the resin may form a layer of a few millimetres from the surface of the blade, even in regions of the blade which are undamaged. This ensures a smooth aerofoil finish.

The mould may be for example around 20-50 cm long in the direction of the length of the blade. The flexible sheet may be substantially rectangular.

The flexible sheet may have side walls in the form of extensions from the surface of the sheet which faces the blade in use. The side walls act to space the surface of the sheet away from the blade when the mould is fixed to the blade, creating a space between the blade and the mould into which resin can be injected. The side walls seal the mould against the blade at either side so that resin does not ooze out of the mould. The side walls allow the resin to fill a space between the blade and the mould, thereby forming a new layer of material over the leading edge of the blade. This makes the leading edge of the blade smooth and aerodynamic, closely following the original profile of the blade leading edge. This is preferable to simply trying to fill individual cavities caused by erosion to restore the original surface of the blade, because by adding a complete new layer of material, the external surface can be made much smoother to create a good aerofoil shape. The repair may also be more durable, since the resin cures in one piece which is strongly bonded to the blade.

The side walls are preferably tapered, for example to space the flexible sheet from the blade by about 6 mm in the centre of the leading edge, and tapering out the spacing of the sheet from the blade until the sheet is touching, or almost touching, the blade on top and bottom surfaces of the aerofoil blade. This allows the new layer of material to smoothly interface with the original surface of the blade at its extremities.

In embodiments, the side walls may space the flexible sheet from the blade by at least 3 mm, at least 4 mm, at least 5 mm, at least 6 mm, at least 7 mm or at least 8 mm in the centre of the leading edge, and taper out to space the sheet from the blade by no more than 2 mm, no more than 1 mm, no more than 0.5 mm or no more than 0.2 mm at the fullest extent of the flexible sheet onto the top/bottom surface of the blade.

In one embodiment, the method makes use of two different moulds—a first mould which comprises a flexible sheet having side walls as described, and a second mould which lacks the side walls, or which lacks at least one of the side walls. The first mould is used first and resin is injected to repair part of the edge of the blade, along the length of the first mould, for example about 30 cm. A space along the blade is then left of just less than the length of the mould, for example the space may be about 25 cm long. Spaced along the blade by that distance, the first mould is used again and resin is injected. This process is repeated along the full length of the blade, so that resin is injected in "stripes" along the blade, with spaces between the stripes which are just less than the length along the blade associated with each stripe. Moreover, the spaces between the stripes are less than the length of the second mould. The second mould is a similar length to the first mould, but lacks the side walls.

The second mould may be fixed to the turbine blade covering one of the spaces between the resin stripes made with the first mould. Since the second mould is somewhat longer than the space, sides of the sheet of the second mould can be placed against the resin stripes on either side of the space. Hence, the second mould is spaced from the surface of the blade to leave a gap between the blade and the sheet of the second mould. Resin can then be injected into the second mould and allowed to cure. This process may be repeated all the way along the turbine blade, using the second mould to fill each space between the resin injected into the first mould. The result of this is a smooth and aerodynamic leading edge of the blade, formed from the injected resin, which closely follows the original profile of the blade leading edge.

An alternative method may begin with use of the first mould as described above to inject resin and repair for example about a 30 cm length along the edge of the blade, and then use a second mould which has one side wall along one side, but no side wall along the other side. This second mould with one side wall may be used to extend the repair, with the side lacking the wall being installed over part of the resin repair made by the first mould. This process may be repeated, using the second mould as many times as necessary to extend the resin repair along the length of the blade, or along the length of the section which needs to be repaired. However, the first described method, where the first mould is used to create "stripes" with the second mould having no side walls then being used to fill in the gaps, is likely to be preferred since resin stripes created by the first mould are spaced from each other, and therefore creating a resin stripe along the blade does not disturb the previous resin stripe formed, which may not yet be completely cured. By the time the second mould is used to fill in the gaps, the stripes created with the first mould are likely to be completely cured. Preferably therefore, the first mould is used starting at a first end of the blade (or section of the blade) and then moving along until the other end is reached, and then when the second mould is used the gaps between the stripes are filled in starting again from the first end.

The or each mould may include a framework behind the flexible sheet, i.e. attached to the side of the flexible sheet which faces away from the surface of the blade. The framework may be flexible in one direction, so that the mould may be conformed to the curved edge of the blade, but substantially rigid in a perpendicular direction. As such, the framework may comprise a plurality of elongate elements running along the length of the mould (i.e. in the direction along the length of the blade when the mould is in use). The elongate elements may be joined to each other by hinges, so that the mould can flex in one direction but not in the perpendicular direction. The mould is rigid in the direction along the length of the blade, but flexible in the direction around the edge of the blade.

The elongate elements may be, for example, stainless steel rods. They may be joined together by hinges, for example, pin-and-barrel hinges, preferably substantially along the length of the rods. The hinges may be made from a rigid plastic. The hinges may include surfaces between the rods on which the flexible sheet of the mould is fixed and supported.

In other embodiments, the hinges may be for example living hinges.

The mould is fixed temporarily to the turbine blade while resin is injected and allowed to cure. The mould may be fixed to the turbine blade by cables or straps which are tightened around the mould to hold the mould against the blade. The cables or straps may then be released when the resin is cured and the mould needs to be removed or moved along the blade to continue the repair.

Preferably, anchors are provided on a top and bottom surface of the aerofoil blade. The anchors may be fixed to the blade surface, for example with suction cups. Cables/straps can be passed between the anchors on the top and bottom surfaces of the blade, and over the mould to clamp the mould against the blade surface. One or both of the anchors may include a ratcheting spool for tightening the cables or straps.

The or each mould may include force transfer elements for receiving the clamping cables/straps around the mould and for transferring force from the cables/straps as they tighten, to press the mould perpendicularly against the blade. The force transfer elements may extend from the back of the mould, i.e. extend from the surface of the mould which faces away from the blade. The force transfer elements may define a track for the cables/straps which is a different profile from the curved edge of the blade. This ensures that there is a sufficient component of the clamping force in the direction perpendicular to the blade, at every point around the curved edge of the blade and especially where the mould is against the blade on the top and bottom surfaces of the aerofoil. This ensures a smooth transition from the resin repair into the top and bottom surfaces and preserves the aerodynamic performance of the repaired blade.

The flexible sheet of the mould may include an aperture for allowing introduction of the resin. The sheet may be made for example of silicone, and the aperture may be in the form of a pair of perpendicular cuts, i.e. a cross cut into the silicone sheet to form a valve. Preferably, the framework of the mould is reinforced around the aperture to support the nozzle of a resin gun around the aperture.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
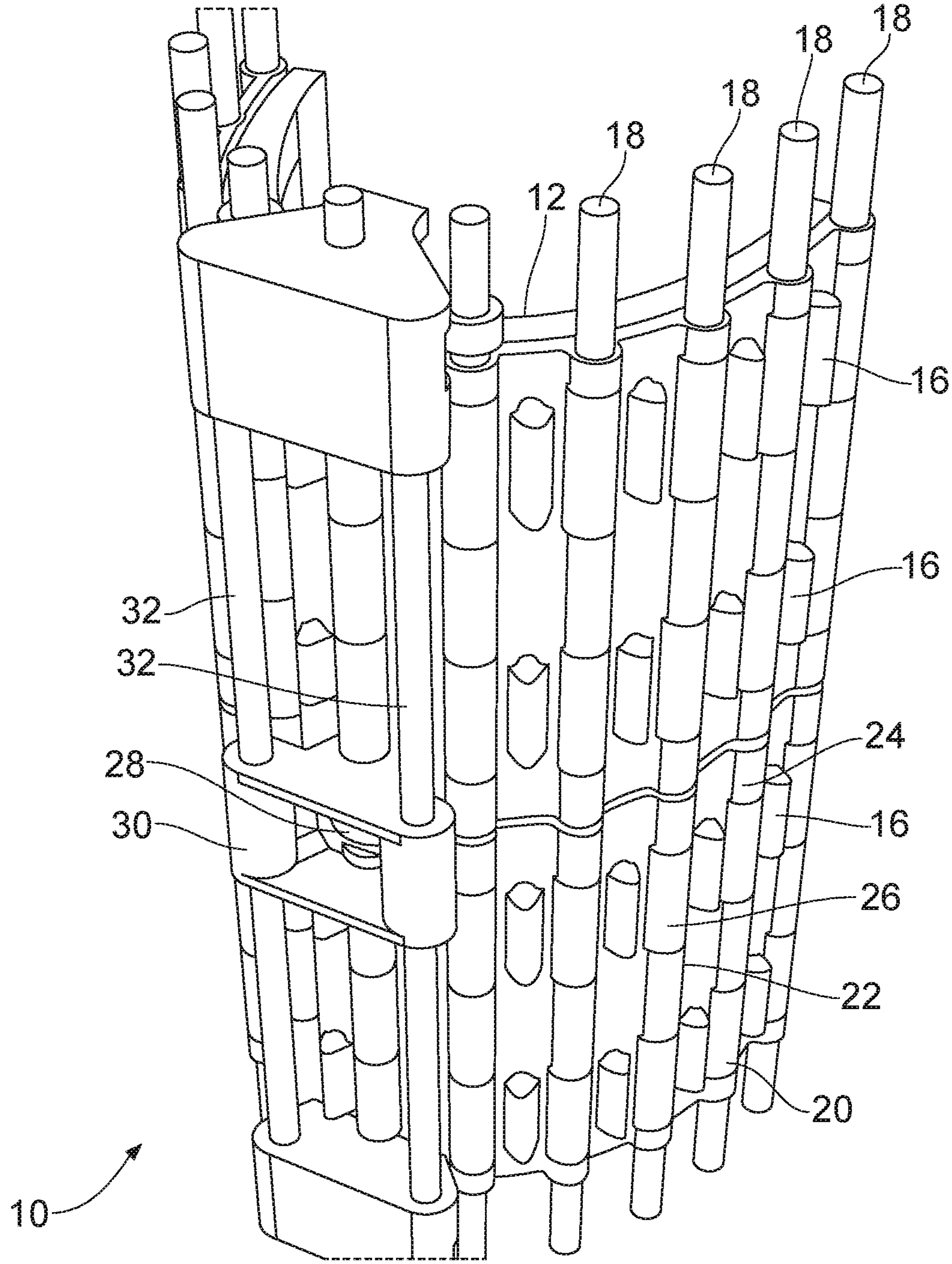
FIG. 1 is a perspective view from behind of a mould tool for use in repairing a wind turbine blade according to the invention.
Figure 2:
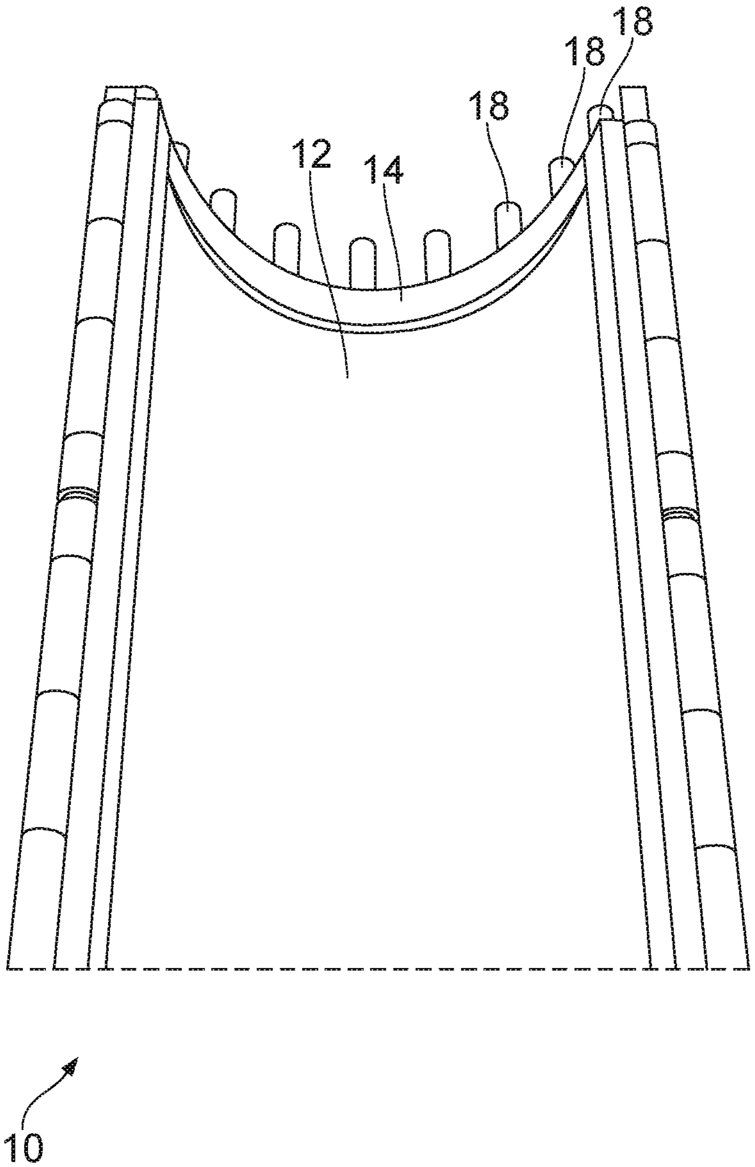
FIG. 2 is a perspective view from in front of the mould tool of FIG. 1.

Referring firstly to FIGS. 1 and 2, a mould tool for use in repairing a leading edge of a wind turbine blade is indicated generally at 10.

The mould tool is shown from behind in FIG. 1, i.e. looking towards the surface of the mould tool which faces away from the turbine blade when the mould tool is in use. FIG. 2 shows the mould tool from in front, i.e. looking towards the surface of the mould tool which faces towards the turbine blade.

The mould tool 10 includes a flexible sheet 12. The flexible sheet 12 is made from silicone. A side wall 14 extends from the periphery of the flexible sheet 12, at each side of the flexible sheet 12. The side wall is thicker at its centre, for example raised about 6 mm from the front surface of the flexible sheet 12, and tapers out until it is not raised at all from the front surface of the flexible sheet 12 at either end of the side wall 14.

A second type of mould tool, not shown in the drawings, does not have the side wall 14 and instead the front surface of the flexible sheet is substantially smooth from one side to the other.

The silicone flexible sheet 12 has resilient clips 16 integrally formed with the flexible sheet, and extending from the rear surface of the sheet 12. The resilient clips pass through apertures in a framework of the mould 10, and retain the flexible sheet onto the framework. If necessary, the flexible sheet 12 can be removed from the framework, which may be useful if the flexible sheet 12 becomes damaged with use—then the flexible sheet 12 can be replaced with a new one, while keeping the same framework which is likely to be more durable.

The framework comprises a plurality of stainless steel rods 18. In the illustrated embodiment, there are eleven rods 18. The rods 18 run parallel to each other. The rods 18 are hinged to each other by plastic hinges 20. Each hinge 20 is made from a rigid plastic material, and includes a central web section 22 and barrels 24, 26 on either side of the web section. One of the rods 18 is inserted through the barrels 24 on one side of the hinge 20 and a neighbouring rod is inserted through the barrels 26 on the other side of the hinge 20. Apart from the two rods at the extremities of the mould 10, each rod passes through barrels associated with two hinges. In this way, the rods are all hinged to each other which makes the mould flexible perpendicular to the rods, but rigid along the axes of the rods.

The web section 22 of each hinge includes apertures corresponding to the resilient clips 16 of the flexible sheet 12. Hence the resilient sheet is held onto the web sections 22 of the hinges. In turn the hinges 20 are fixed to each other via the rods 18.

The position of an aperture through the flexible sheet 12 is indicated in FIG. 1 at 28. The aperture may be in the form of two perpendicular cuts in a cross shape, through the silicone sheet 12. The aperture allows introduction of a viscous resin from a resin gun. A nozzle receiving support 30 surrounds the aperture 28 and assists with positioning the nozzle of a resin gun.

The nozzle receiving support 30 is fixed to a pair of reinforcing rods 32. The reinforcing rods 32 run parallel to the rods 18, and are fixed on a pivot to the central one of the rods 18. The reinforcing rods 32 provide additional rigidity to the framework of the mould, along the central portion where resin will be forced into the mould.

Figure 3:
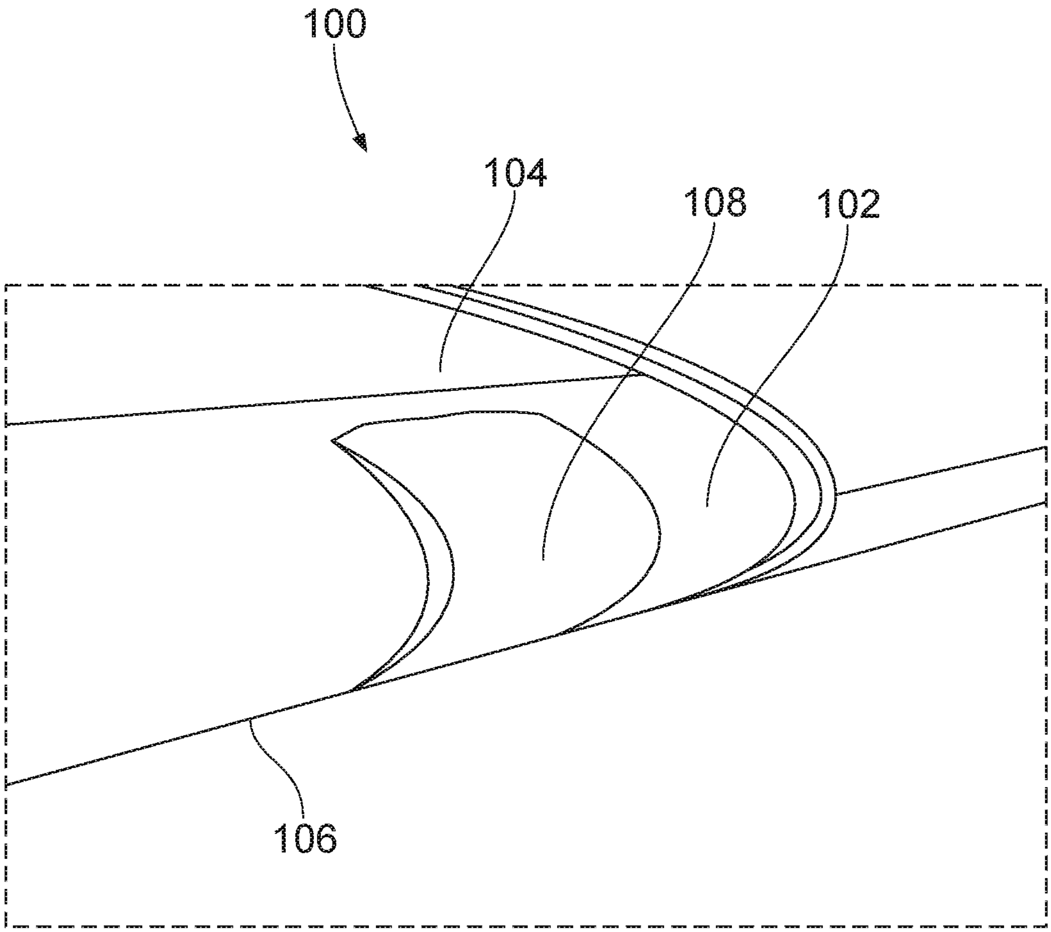
FIG. 3 is a photograph of a resin repair made to the leading edge of a wind turbine blade according to the invention.

In use, the mould tool is placed around a leading edge of a wind turbine blade 100. The central one of the rods 18 runs substantially along the leading edge 102 of the blade, with the mould tool then curving around the top surface 104 and bottom surface 106 of the blade 100. Note that "top surface" and "bottom surface" are labels given based on the aerofoil shape of the blade, and are accurate if the blade is positioned substantially parallel to the ground as shown in FIG. 3. However the blades of course rotate when in use on a wind turbine, and repairs may be carried out when the blades are at different angles.

The mould tool 10 is held fixed to the blade as will be described in more detail below, and resin is then squeezed in from a resin gun through aperture 28. The mould tool 10 when held fixed to the blade is essentially sealed against the blade at its two side walls 14, and along the edges of the flexible sheet 12 which run perpendicular to the side walls 14. The side walls 14 position the flexible sheet 12 so as to define a space between the blade and the flexible sheet 12 which is filled with resin when injected into aperture 28. The resin is allowed to cure while the mould tool 10 fixed in place, which takes for example a few minutes, and then the mould tool 10 can be removed. Note that the curing time before the mould tool is removed may be less than the total time for the resin to completely cure, but enough time for it to cure sufficiently that the shape of the moulding will not change. The result is shown in FIG. 3—resin 108 becomes bonded to the blade to remake the leading edge of the blade along a short section of the blade. Note that a new edge is made from resin, which is proud of the original blade edge—a new layer of material is added to the blade so that a continuous edge is formed from the resin.

Figure 4:
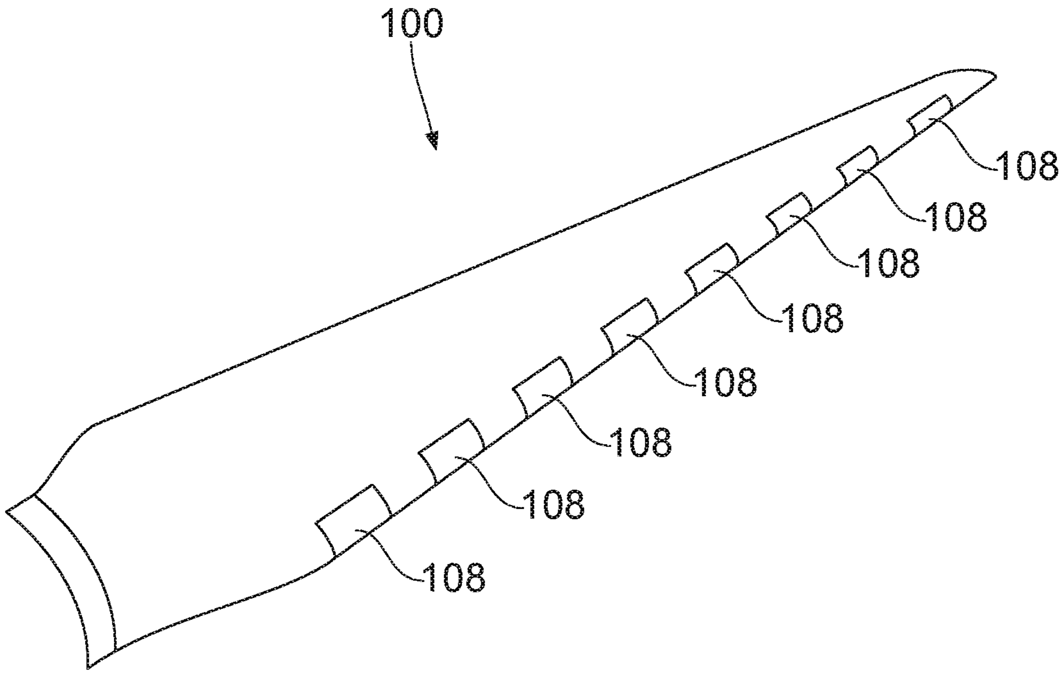
FIG. 4 is a schematic of a pattern of resin mouldings at an intermediate stage of a repair according to the invention.

To remake the leading edge all the way along the blade, the process is repeated. The mould tool 10 is reusable and is flexible to conform to the curve of the leading edge of the blade, which is likely to change along the length of the blade. As shown in FIG. 4, the mould tool 10 is fixed, and resin 108 is injected, repeatedly along the length of the blade 100 in a "striped" pattern. The space between each stripe of resin 108, as shown in FIG. 4, is slightly less than the extent of a single stripe along the blade. The gaps between the stripes can then be filled using a second mould tool, similar to the mould tool 10 but lacking the side walls 14. The second mould tool is fixed to the blade 100 so that sides of the mould tool overlap with two of the stripes 108 of resin on either side. The mould tool seals against the two resin stripes 108, and against the top and bottom surfaces of the blade. Resin is then injected to fill the space defined by the blade 100, the stripes 108 on either side and the flexible sheet of the second mould tool. When the resin has cured the second mould tool can be removed from the blade, and the process is repeated to fill each gap between stripes 108, all the way along the length of the blade.

FIG. 4 shows a process of resin being cast substantially along the whole length of the blade. However, in many cases it may only be necessary to cast resin over, for example, the outermost third of the turbine blade, for example about the end 10 metres of a 30-metre-long blade. It is the outermost parts of the blade which travel fastest through the air when the turbine is operating, and therefore the outermost parts which tend to be most vulnerable to damage and erosion along the leading edge.

Figure 5:
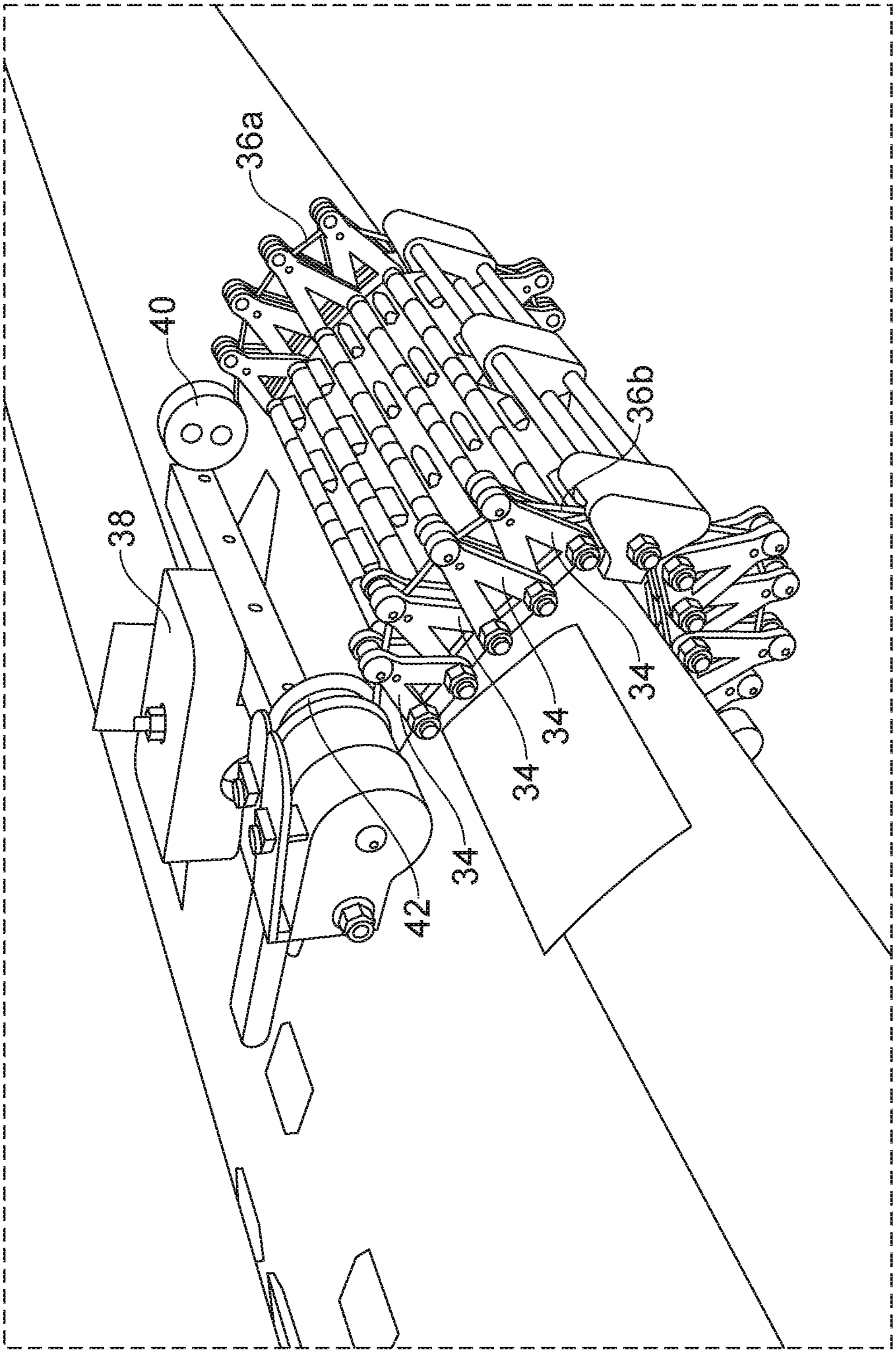
FIG. 5 shows a mould tool fixed to a wind turbine blade by anchors and cables, ready for injection of resin.

The fixing of the mould tool 10 to the blade will now be described, with reference to FIG. 5. The mould tool 10 is substantially the same construction as is shown in FIG. 1, but additional components are present for fixing the mould tool 10 in place against the blade. In particular, triangular force transfer elements 34 are provided along the sides of the mould tool 10, extending away from the mould tool from the back surface of the mould tool. Each of the triangular force transfer elements is pivotally connected to two of the rods 18, in the same way as one of the hinges 20. The triangular force transfer elements include supports for cables 36*a*, 36*b*, the supports being spaced from the back of the flexible sheet (12). The supports define a path for the cables 36 which is not necessarily parallel with the path of the flexible sheet 12 around the blade 100. In particular, the force transfer elements may extend away from the back of the mould tool by differing extents, i.e. some of the force transfer elements put a respective support further away from the flexible sheet than others. This creates more curvature in the path of the cables 36 corresponding with parts of the mould tool which lie relatively flat, and therefore defines a path for the cables 36 which is optimised to ensure that when the cables 36 are tightened, there is sufficient force pushing the mould against the blade, so that the side walls of the mould contact and press against the blade and a seal is formed, so that resin cannot escape from the mould.

An anchor 38 is fixed to the top surface of the blade 100. One or more suction cups (not visible in FIG. 5) can be used to fix the anchor 38 in place. A similar anchor is fixed to the undersurface and is not visible in FIG. 5. The cables 36 run between the anchors and along the path defined by the supports of the force transfer elements 34, to hold the mould tool against the blade.

In this embodiment, an end of a cable 36*a* is fixed to the anchor 38 at fixing point 40. The cable 36*a* runs along the supports of the force transfer elements 34 on one side (the far side in FIG. 5) of the mould tool, and to the other anchor which is attached to the undersurface of the blade. The cable is then wound onto a spool (not visible in FIG. 5) on the other (underside) anchor. The spool may be wound to tighten the cable 36*a*.

An end of another cable 36*b* is fixed to the underside anchor at a fixing point, similar to fixing point 40. The cable 36*b* runs along the supports of the force transfer elements 34 on the near side in FIG. 5 of the mould tool, and to the anchor 38. Anchor 38 includes a spool 42. The spool 42, and the spool of the underside anchor, are each associated with a ratchet (one-way clutch) arrangement to facilitate tightening of the cable 36. In some embodiments, an overtorque clutch may also be provided to ensure that the cable 36 is not overtightened, as overtightening would likely result in the anchors coming free of the blades.

In other embodiments, a single cable may be provided which is fixed to one of the anchors, for example at fixing point 40. The cable then runs along the supports of the force transfer elements 34 on one side (e.g. the far side in FIG. 5) of the mould tool, and to the other (underside) anchor. The cable may be guided through components of the underside anchor and then run through supports of the force transfer elements 34 on the near side of the mould tool, back to the anchor 38. A single spool 42 may then be provided on anchor 38.

In yet other embodiments, a cable may be fixed to the mould tool 10 substantially centrally along the side of the tool, i.e. in a position corresponding with the leading edge of the blade. The cable may then extend in either direction from the centre of the tool 10, over the supports of the force transfer elements 34, with one end of the cable being wound onto a spool of the anchor on the upper surface of the blade, and the other end being wound onto a spool of the anchor on the lower surface of the blade. A similar arrangement may be used on the other side of the mould tool, i.e. a total of four ratcheted spools, one on either side of the anchor on the upper surface and one on either side of the anchor on the lower surface. This further reduces the resistance to tightening the cable caused by drag over the supports which is associated with any one of the spools. In other embodiments, a similar arrangement of cables could share a single spool on each anchor, the cables being guided through components of the anchor to the single spool, which can be used to tighten cables on both sides simultaneously.

In other embodiments, an elastic material may be used in place of the cables. The elastic is therefore "self-tightening" and does not require the ratchets/spools. The elastic may be fixed to the anchors and tighten around the mould tool, or alternatively the elastic may be fixed to the supports at each end of the mould tool itself, with an actuated arm mounted on each anchor to push the outer edge of the mould onto the blade surface.

The apparatus and method described may be used to repair wind turbine blades, preferably without deploying platforms and without removing the blade from the turbine. The mould tool is designed to be attachable to the blade, even by an operative hanging from a rope who will have difficulty pressing against anything with any significant force. Resin can then be inserted and allowed to cure, to create a good quality smooth aerodynamic leading edge on the blade. This allows blades to be more effectively repaired than previously, and the same mould tool can be used to repair different makes, models and sizes of turbine blade.

The embodiments described above are provided by way of example only, and various changes and modifications will be apparent to persons skilled in the art without departing from the scope of the present invention as defined by the appended claims.

The invention claimed is:

1. A method of making a repair to the leading edge of a damaged wind turbine blade, the method comprising the steps of:

providing a mould, the mould comprising a flexible sheet, and fixing the mould to the turbine blade around the edge of the wind turbine blade to create a space between the turbine blade and the mould into which a resin can be injected;

injecting the resin into the mould and allowing the resin to cure while the mould remains fixed in the position around the edge; and removing the mould from the blade.

2. A method as claimed in claim 1, in which the flexible sheet includes side walls in the form of extensions from the surface of the sheet which faces the blade in use, the side walls being provided on sides of the sheet which run substantially perpendicular to the edge of the turbine blade in use, and acting to space the surface of the sheet away from the blade when the mould is fixed to the blade, creating the space between the blade and the mould.

3. A method as claimed in claim 2, in which the side walls are tapered, for spacing the surface of the sheet from the surface of the blade by a greater extent along the centreline of the edge of the blade than along edges of the sheet distant from the centreline.

4. A method as claimed in claim 3, in which the side walls space a centreline of the sheet from the blade by at least 3 mm.

5. A method as claimed in claim 3, in which the side walls space the sides of the sheet which run perpendicular to the edge of the turbine blade in use from the blade by at most 2 mm.

6. A method as claimed in claim 2, further comprising the steps of:

re-fitting the mould to the blade at a position P along the blade spaced from the position at which the resin was previously injected;

injecting the resin into the mould fitted at the position P and allowing the resin to cure;

removing the mould from the blade.

7. A method as claimed in claim 6, further comprising the steps of:

providing a second mould, the second mould comprising a flexible sheet having a substantially smooth surface between sides of the sheet which run substantially perpendicular to the edge of the turbine blade in use, and fixing the second mould to the turbine blade around the edge of the turbine blade, at a position along the blade which covers the space between the resin repairs already made, and in which the second mould overlaps each of the resin repairs already made;

injecting the resin into the second mould and allowing the resin to cure;

removing the second mould from the blade.

8. A method as claimed in claim 2, further comprising the steps of:

providing a second mould, the second mould comprising a flexible sheet, and a single side wall in the form of an extension from the surface of the sheet which faces the blade in use, the side wall being provided on one of the sides of the sheet which runs substantially perpendicular to the edge of the turbine blade in use, and fixing the second mould to the turbine blade around the edge of the turbine blade, at a position along the blade at which the side of the second mould without the side wall overlaps the resin repair already made;

injecting the resin into the second mould and allowing the resin to cure;

removing the second mould from the blade.

9. A method as claimed in claim 1, in which the mould includes a framework behind the flexible sheet attached to the side of the sheet which faces away from the surface of blade in use, the framework being flexible in a first direction to allow the mould to be conformed to the curved edge of the blade, and substantially rigid in a second direction which is perpendicular to the first direction.

10. A method as claimed in claim 9, in which the framework comprises a plurality of elongate elements, joined to each other by hinges.

11. A method as claimed in claim 10, in which the elongate elements are rods.

12. A method as claimed in claim 1, in which fixing the mould to the turbine blade is achieved by tightening cable(s) or strap(s) around the mould to hold the mould against the blade.

13. A method as claimed in claim 12, in which anchors are fixed to opposing top and bottom surfaces of the blade, for providing an anchor point for the cable(s) or strap(s).

14. A method as claimed in claim 12, in which force transfer elements are provided for receiving the cable(s) or strap(s) around the mould and for transferring force from the cable(s) or strap(s) to press the mould perpendicularly against the blade.

* * * * *